United States Patent [19]

Thomison

[11] Patent Number: 5,022,694
[45] Date of Patent: Jun. 11, 1991

[54] SAFETY LINE LATCH FOR USE WITH TOWING SYSTEMS

[75] Inventor: Ted D. Thomison, Flintstone, Ga.

[73] Assignee: Century Wrecker Corporation, Ooltewah, Tenn.

[21] Appl. No.: 565,907

[22] Filed: Aug. 10, 1990

Related U.S. Application Data

[63] Continuation of Ser. No. 312,528, Feb. 21, 1989, abandoned.

[51] Int. Cl.⁵ .................................................. B66C 1/36
[52] U.S. Cl. ................................. 294/82.2; 294/82.31; 24/116 R
[58] Field of Search ............... 294/82.31, 82.33, 82.19, 294/82.2, 82.24; 24/116 R, 601.5

[56] References Cited

U.S. PATENT DOCUMENTS

| 1,457,648 | 6/1923 | Bailey | 294/82.19 |
| 2,622,543 | 12/1952 | Rousseau | 24/116 R X |
| 2,872,237 | 2/1959 | Standifer, Jr et al. | 294/82.19 |
| 3,501,817 | 3/1970 | Bambenek et al. | 294/82.19 |
| 3,718,946 | 3/1973 | Lunsford et al. | 24/116 R |
| 3,964,777 | 6/1976 | Lindqvist | 294/82.31 X |
| 4,122,585 | 10/1978 | Sharp et al. | 294/82.2 |
| 4,196,876 | 4/1980 | Maughlin et al. | 294/82.31 X |
| 4,539,732 | 9/1985 | Wolner | 294/82.19 X |

Primary Examiner—Margaret A. Focarino
Assistant Examiner—Dean J. Kramer
Attorney, Agent, or Firm—Brooks & Kushman

[57] ABSTRACT

Safety chain latches remove slack from safety chains attached between towing and towed vehicles in a towing system. In one embodiment, a pivotable retainer element is removably coupled to a remaining portion of the latch body for enabling release of a latched safety line independently of the open or closed position of the retainer element.

4 Claims, 2 Drawing Sheets

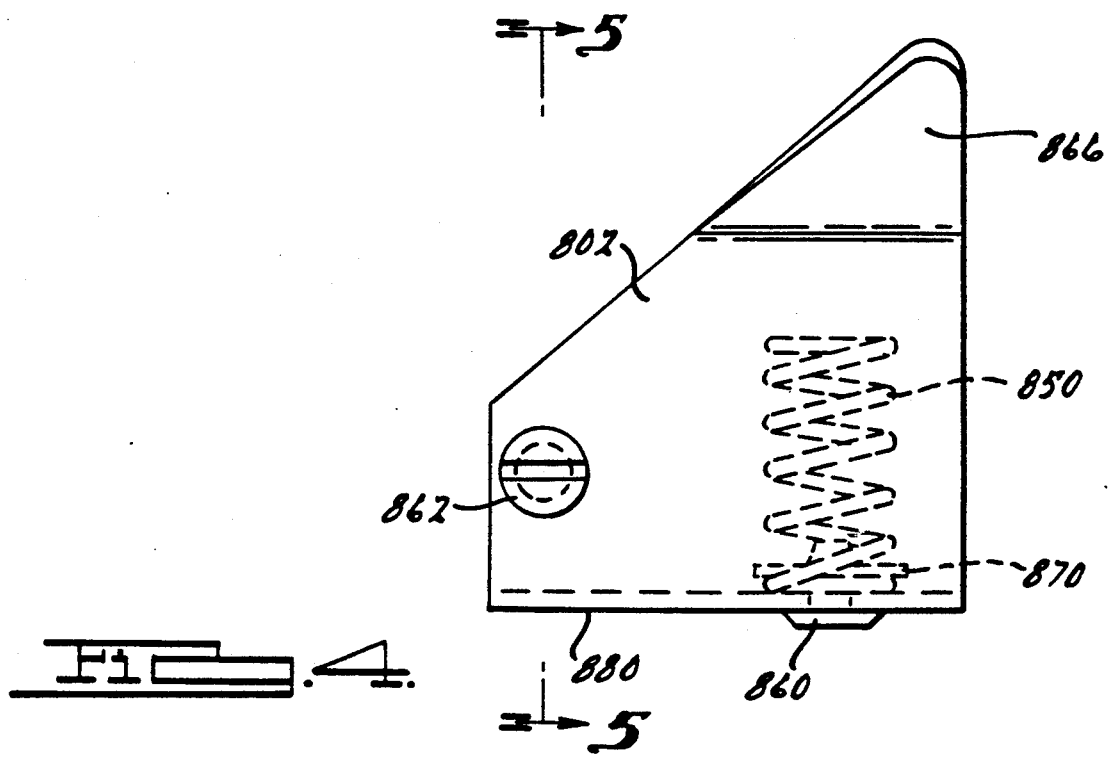
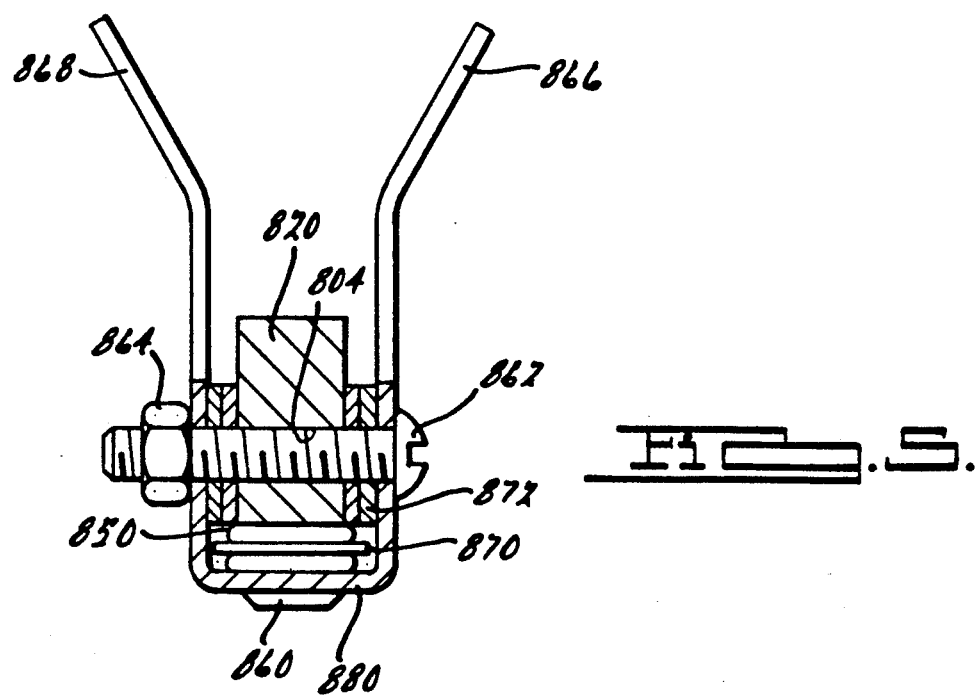

SAFETY LINE LATCH FOR USE WITH TOWING SYSTEMS

This is a continuation of copending application Ser. No. 07/312,528 filed on 2/21/89 now abandoned.

BACKGROUND OF THE INVENTION

The invention relates generally to safety line latching apparatus for use with vehicle towing systems. More specifically, the invention concerns such apparatus for use with towing systems wherein the towed vehicle is lifted and towed principally by its wheels, and the latching apparatus retains a safety line, such as a chain, in a taut towing condition.

The concept of using detachable, inwardly facing L-shaped wheel cradles in a wheel lift towing system was first introduced in U.S. Pat. No. 4,679,978-Holmes et al., assigned to the same assignee as this invention. So-called "wheel lift" towing approaches avoid the need for the conventional tow truck sling assembly by using wheel engaging structures or "wheel cradles" which engage the front or rear wheels of a vehicle to be towed to lift the wheels and therefore one end of the vehicle substantially without engaging any other portion of the vehicle. The '978-Holmes et al. patent disclosed such a wheel lift tow assembly mounted to the frame at the rear of a tow vehicle and moveable vertically. The two assembly of the Holmes et al. disclosure included a telescopic tow bar extended and retracted from the rear of the vehicle and a cross arm pivotally mounted intermediate its ends about an upwardly extending axis to a rear portion of the telescopic tow bar. L-shaped wheel cradles were releasably connected to end portions of the cross arm in the Holmes et al. patent.

The present invention is for use with safety lines, such as chains, used in conjunction with wheel lift systems which do not employ straps or belts securing the towed wheel to its associated wheel cradle. One such beltless wheel lift arrangement is disclosed in a co-pending application to Holmes et al., filed of even date herewith and entitled QUICK CONNECT/DISCONNECT WHEEL CRADLE ARRANGEMENT FOR WHEEL LIFT TOWING SYSTEMS.

SUMMARY OF THE INVENTION

Apparatus for use with a towing system which will engage and latch an elongate flexible member such as a safety chain. The latching apparatus includes a body member having a cavity opening at first and second opposing lateral surfaces of the body member and at a first edge surface, the cavity defining a receiving slot for the elongate flexible member. A retainer element is pivotally coupled to a portion of the body member and is operative in a first position to close off the receiving slot at the first edge surface so as to retain any elongate flexible member previously placed in the receiving slot and further operative under pivoting motion to a second position to open the receiving slot at the first edge surface to enable entry or exit of the elongate flexible member. The retainer element is biased to the first or closed position.

BRIEF DESCRIPTION OF THE DRAWINGS

These and other objects and features of the invention will become apparent from the reading of a detailed description taken in conjunction with the drawings, in which:

FIGS. 4 and 5 are side and bottom views, respectively, of a safety line retainer assembly designed in accordance with the principles of the invention.

DETAILED DESCRIPTION

Figure 1:
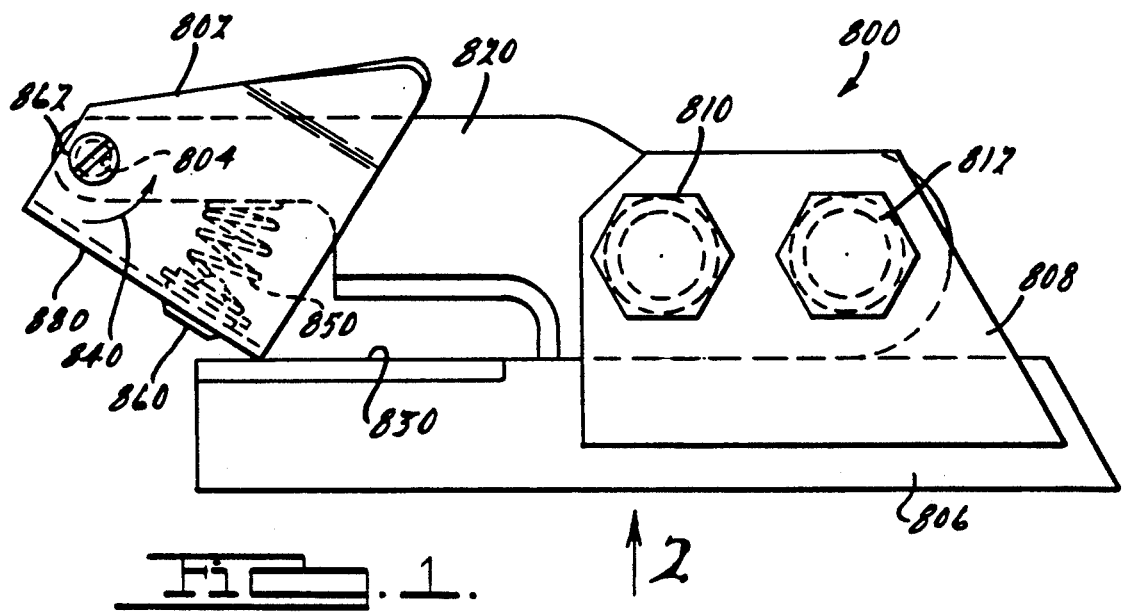
FIG. 1 is a side plan view of a latching mechanism for a safety line or chain designed in accordance with the principles of the invention.
Figure 2:
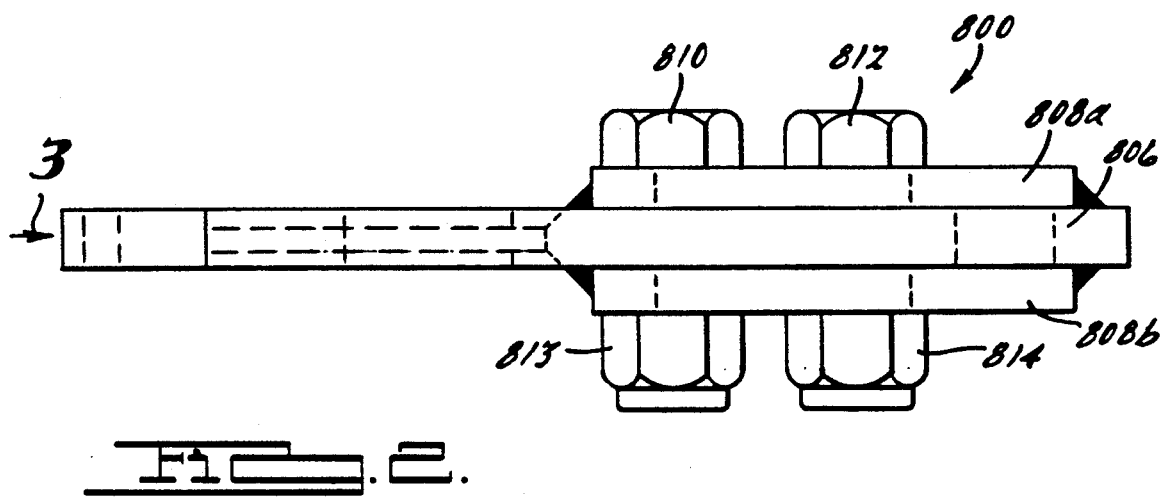
FIG. 2 is a view of the latching mechanism of FIG. 1 taken along arrow 2 thereof.
Figure 3:
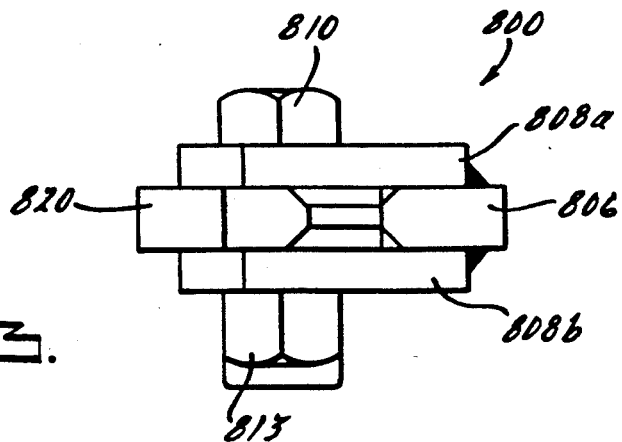
FIG. 3 is an end view taken along arrow 3 of FIG. 2.

With reference to FIGS. 1-3, latch element 800 includes a mounting plate portion 806 welded to a pair of chain latch plates 808a and 808b which are coupled to a chain latch retainer element or "flapper" carrier element 820 via a pair of bolts 810 and 812 which engage nuts 811 and 813, respectively. Pivotally mounted to carrier 820 is a retainer element or flapper 802 which pivots about a pivot screw 862 in a direction indicated by arrow 840. Retainer element 802 is biased to the closed condition via a compression spring 850 held in place in retainer element 802 via a pop rivet 860 along a closed surface 880 of the retainer element. In cross section, retainer element is a substantially U-shape for enabling pivotal motion of the retainer about chain latch retainer carrier 820.

A chain receiving slot 830 is defined by body element 806 and body element 820 and one side of a retainer element 802 in the closed position. Receiving slot 830 is therefore seen to be a cavity opening at first and second opposing lateral surfaces of the chain latch body and also opening at a first edge surface. Retainer element 802 is pivotally coupled to a portion of the latch body defined by carrier 820 and is operative in a first position to close off the receiving slot at the edge surface so as to retain any elongate flexible member, such as a safety chain, previously placed in the receiving slot. The retainer element 802 is further operative under pivoting motion to a second position in the direction of arrow 840 to open the receiving slot at the edge surface to enable entry or exit of the elongate chain. The retainer element 802 is biased to the closed position via the compression spring 850.

In a typical application, body element 806 would be coupled, such as by welding, at its bottom (as viewed in FIG. 1) surface to a cross arm member of a towing system at a point where tautness of a safety chain is to be maintained.

In those situations where it is desired to release a chain held from the slot under the condition of inoperability of pivotable retainer element 802, bolts 810 and 812 would be unscrewed from their respective nuts 811 and 813, thereby enabling removal of carrier element 820 away from mounting plate member 806, in turn enabling retraction of a safety chain previously held in chain receiving slot 830.

The details of the carrier member 802 and its captured compression spring 850 are set forth in FIGS. 4 and 5. One end of compression spring 850 is retained against a closed surface 880 of the U-shaped retainer element via a pop rivet 860 and a washer 870. Retainer element 802 is restrained against motion normal to its longitudinal axis via washer stacks 872 and 874 which are placed between carrier element 820 and side walls 866 and 868 of retainer element 802.

Retainer element 802 pivots about screw 862 which couples the retainer to the chain latch retainer carrier 820 in conjunction with a nut 864.

The invention has been described with reference to an illustrative embodiment, the details of which are given for the sake of example only. The scope and spirit of the invention is defined by the appended claims.

What is claimed is:

1. A latching mechanism for securely holding a safety chain in place, the latching mechanism comprising:
   a base member, said base member having a slot therein, said slot being open at one end,
   a retainer member attached to said base member and being movable between a first position covering said open one end of said slot and a second position allowing access to said slot,
   said base member comprising two portions, a first portion attached to said retainer member, and a second portion releasably fastened to the first portion,
   whereby when said retainer member is in said first position the chain is securely held in said slot, and when said retainer member is in said second position the chain is removable from said slot, and
   whereby when the two portions are released from one another, the chain is removable from said slot without movement of said retainer member.

2. The latching member as set forth in claim 1 further comprising biasing means biasing said retainer member towards said first position closing said slot.

3. The latching member as set forth in claim 1 wherein said retainer member is positioned such that a sliding movement of a chain against said retainer member in the direction entering said slot moves said retainer member to said second position allowing entry of said chain into said slot, said retainer member being biased in a direction towards said first position closing said slot.

4. The latching means as set forth in claim 1 wherein said biasing means comprises a spring means coupled to said retainer member and bearing against the base member.

* * * * *